Patented Feb. 27, 1951

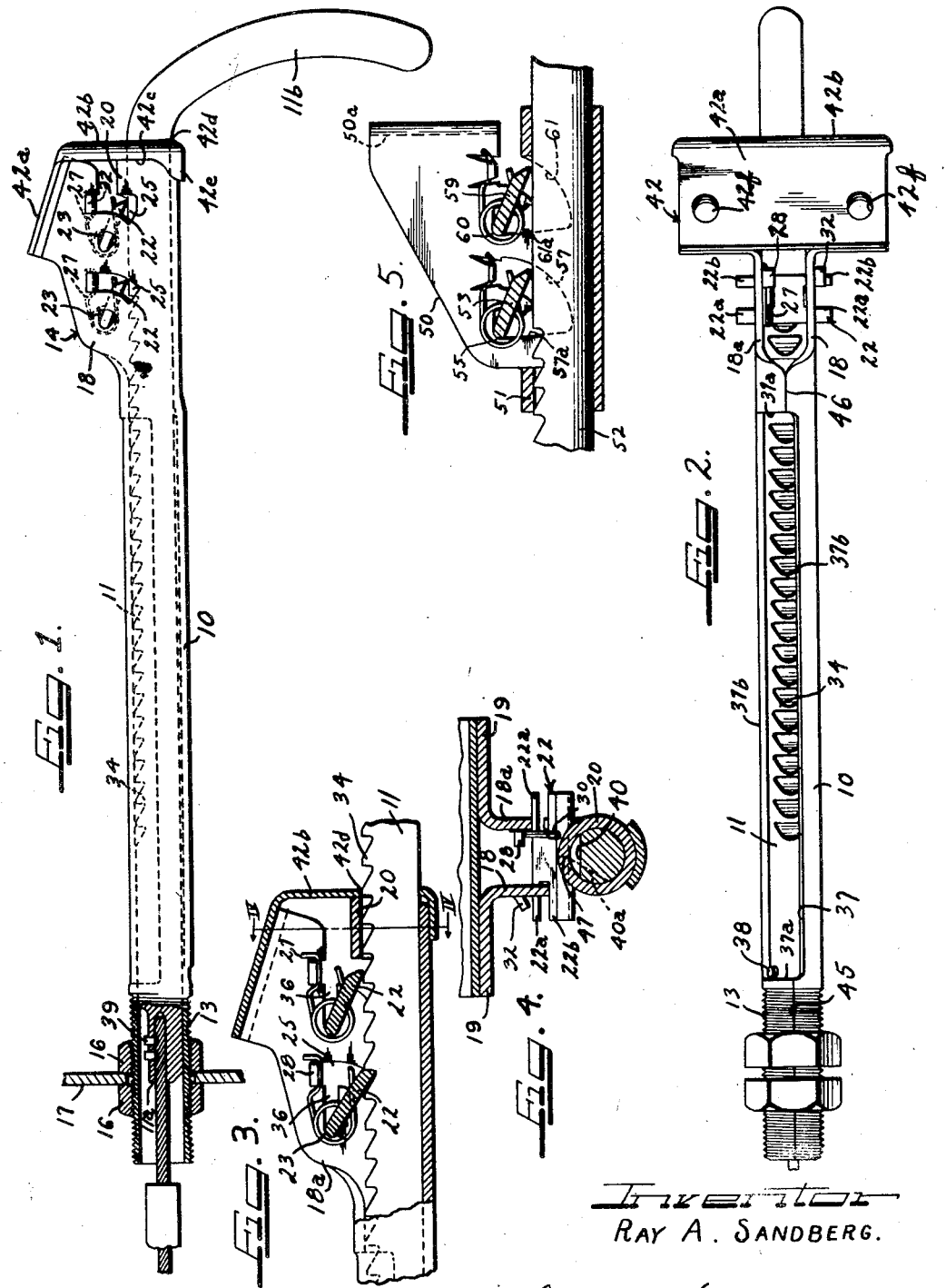

2,543,509

UNITED STATES PATENT OFFICE 2,543,509

STRAIGHT PULL BRAKE LEVER STRUCTURE

Ray A. Sandberg, Waukegan, Ill., assignor to Houdaille-Hershey Corporation, Detroit, Mich., a corporation of Michigan Application October 10, 1947, Serial No. 779,183

13 Claims. (Cl. 74—503)

1

This invention relates to improvements in straight pull brake lever structures, and more particularly to structures of this character which are especially adapted for use as emergency brake levers in automobiles or the like.

An important object of this invention is to provide an improved, simplified and efficient straight pull brake lever structure.

Another object of this invention is to provide an improved brake setting mechanism adapted for use with an emergency brake or the like.

Yet another object of this invention is to provide in a straight pull brake lever structure an improved pull rod guide structure arranged to be efficiently and economically formed by simple sheet metal stamping methods of manufacture.

A further object of this invention is to provide improved means for limiting the rotation of the pull rod in the guide housing and the longitudinal movement of the rod therein.

A still further object of this invention is to provide improved means for mounting the brake lever structure on the fire wall and the instrument panel of an automobile.

According to the general features of this invention there is provided a pull rod adapted to be attached to a brake operating cable and having a series of ratchet teeth selectively engageable with a plurality of spring-urged pawls which are pivotally mounted at one end of the structure in which the pull rod is guided. In a preferred embodiment, setting of the brake is effected by engagement of the spring-urged pawl with the ratchet teeth, while release of the brake is accomplished by pivoting the pawls out of engagement through rotation of the pull rod.

Other objects, features and advantages of the present invention will be readily apparent to one skilled in the art from the following detailed description of certain preferred embodiments thereof taken in conjunction with the accompanying drawings, in which:

Figure 1 is a side elevational view, partly broken away and partly in section, of a straight pull brake lever structure according to the present invention;

Figure 2 is a plan view of the lever structure of Figure 1;

Figure 3 is a fragmentary side elevational view, partly broken away and partly in section, of the pawl housing portion of the lever structure of Figure 1;

Figure 4 is a vertical sectional view taken substantially on line IV—IV of Figure 3;

Figure 5 is a fragmentary side elevational view, partly broken away and partly in section, of a modified form of the pawl housing of this invention.

As shown in Figures 1 and 2, the illustrative straight pull brake lever structure includes a guide housing 10 arranged to journal in sliding relation a pull rod 11.

The guide housing 10 is substantially a tube having a threaded portion 13 at the forward end and an upwardly extending preferably integral cage or housing and attachment portion 14 at the rear end. A pair of lock nuts 16 are arranged to be threaded on the portion 13, one on either side of a fire wall 17 of an automobile or the like with which the brake assembly may be used.

The case 14 comprises two substantially parallel wall members 18 and 18a which extend tangentially upwardly at opposite sides of the housing tube 10. Extending laterally and in respectively opposite outward direction from each wall member is a flange or ear 19, lying coplanar and corresponding to installation requirements, herein shown as slanting rearwardly. It is to be noted that the tubular form of the guide housing is interrupted to accommodate the cage 14 which has a rear extremity tubular guide portion 20 facilitating initial positioning of the pull rod 11 in the housing and assisting in subsequent guiding of the rod.

For brake setting of the pull rod 11, a pair of substantially H-shaped pawls 22 are each arranged for pivoting on a pair of oppositely lateral, coaxial forward arms 22a in pivotal bearing holes 23 in the walls 18 and 18a of the cage 14. A pair of similar rearwardly spaced idler arms 22b are adapted to swing in arcuate slots 25 provided therefor in the cage walls. In every pivoted position of the pawl the arms 22b cooperate with one wall of the slot to prevent canting of the pawl by maintaining the pivot arms 22a in their bearing holes 23.

Although gravity is ordinarily sufficient to maintain the pawls in operative relation to the pull rod, means may be provided for positively urging them toward the rod, such as torsion springs 27. Each spring may be coiled from thin spring wire, having one end anchored under an inturned tab 28 which is struck integrally from the wall 18a at the upper ends of the guide slots 25 above the push rod 11. The other end of the spring is disposed in a groove 30 in the adjacent forward arm 22b of the H-shaped pawl. The coiled portion of the spring is disposed about the adjacent forward leg 22a. Thus, the active edges of the pawls 22 are always urged downwardly by spring pressure.

In Figures 1 and 4, it is seen that a second set of spring tabs 32 are provided which extend transversely outwardly and slant downwardly from the wall 18. These tabs 32, which are more easily accessible, may be used instead of the tabs 28 when the replacement of the springs 27 is necessary.

Each pawl 22 has a beveled rear edge adapted to contact the forward sides of ratchet teeth 34 cut on the upper surface of the pull rod 11. The knife edge formed between the beveled edge of the pawl and the flat-bottom surface thereof permits the use of a ratchet having teeth with exceptionally small pitch and spacing. This arrangement gives the operator a fine adjustment for setting his brakes.

Each of the pawls 22 may be positioned in the cage 14 through a substantially horizontal opening 36 provided in the cage wall member 18a, Figure 3, between the pivot hole 23 and the arcuate slot 25. Since the pawl 22 is never pivoted into a horizontal position during operation, the pawl is thus locked against lateral displacement.

As seen in Figure 3, the pawls are so spaced longitudinally from each other, that when one is in operative engagement with the forward or ratchet face of a tooth, the other has moved half way along the rear or pitch face of the succeeding tooth. Thus, the pull rod 11 can be selectively advanced in increments equal to one-half the pitch distance between the teeth of the ratchet. It is, of course, obvious that by using a greater number of spaced pawls finer adjustment can be obtained.

As best seen in Figure 2, a cut-out longitudinal portion 37 is provided on the upper surface of the tubular guide housing 10. A stop pin 38, secured in the forward end portion of the pull rod 11, is arranged to have its longitudinal movement limited by the end walls 37a of the cut-out portion 37 while the amount that the rod can be rotated is limited by the side walls 37b of the cut-out.

The lever structure of this invention is adapted to be secured to the underside of the instrument panel of an automobile by means of the flanges 19 reinforced by end plate structure 42. This comprises a flat, slanted top portion 42a arranged to overlie the slanted flanges 19 of the cage 14 and to be secured thereto, as by spot welding. A rear wall escutcheon portion 42b has forwardly extending side flange portions 42c and an aperture 42d, Figure 3, through which the rod 11 passes. The mounting plate is further secured as by welding to the housing shaft of an arc-shaped flange 42e which fits under the tube-like rear guide portion 20 of the housing. A pair of holes 42f, extending through the endplate 42 and the flanges 19, are arranged to receive bolts for securing the structure to the instrument panel.

The pull rod 11 has a central bore 11a at its forward end in which a brake control cable is secured by any suitable means such as pins or stakes 39. At its rear end the pull rod is bent downwardly in an arc shape to provide a handle portion 11b.

As has already been noted, the pawls 22 which are pivotally mounted in the cage 14 are biased into engagement with the teeth on the upper surface of the rod 11 as the rod is pulled rearwardly thereunder. The engagement of the pawls 22 with the teeth of the ratchet sets the emergency or parking brake and prevents forward movement of the pull rod to release the brake. In Figures 3 and 4 the rod 11 is shown in the locked position.

To release the brake, the rod 11 is rotated counterclockwise within the limits permitted by the stop pin 38 until the pawls are pivoted out of contact with the teeth and clear the grooves 40 at the bottom of the ratchet teeth. In this position, shown by dash line 40a in Figure 4, the pawls will be completely disengaged from the ratchet teeth 34 and ride on the cylindrical periphery of the pull rod so that the latter may be pulled or pushed forwardly to release the brake.

The housing 10 may be made from a single stamping formed into the required tubular shape with the upstanding cage portion with abutting surfaces, as at a contact line 45 and 46, Figure 2, and line 47 of Figure 4.

An alternate and sometimes more convenient method of making the housing is to join, as by welding, two complementary oppositely disposed stampings. For convenience, the housing may be divided into two similar pieces along the longitudinal vertical plane in which the contact surfaces 45 and 46 lie.

In Figure 5 is shown a modified form of the cage of this invention. This is a sectional view showing one wall 50 of the cage, a laterally extending flange 50a for mounting on the instrument panel, and a portion of the tubular guide member 51 in which a brake setting pull rod 52 is disposed. A substantially H-shaped pawl 53, identical to the pawl 22 of Figure 4, is arranged for pivoting on outwardly extending legs, not shown, in a bearing hole 55 in the wall 50 of the cage. The rearward end of the pawl 53 has outwardly extending arms adapted to swing in an arcuate slot 57 which is connected to the bearing hole 55 by a substantially vertical slot 57a.

A second pawl 59, identical to the pawl 53, is disposed rearwardly therefrom, being pivotally mounted in a bearing hole 60 and having arms adapted to swing in an arcuate slot 61 which is connected to the bearing hole 60 by a substantially vertical slot 61a.

A spring 63, disposed about the pawl 53 and having one end portion abutting an inwardly projecting tab 64 and the other end portion abutting one of outwardly extending arms of the pawl tends to urge the pawl downwardly against the pull rod 52. Thus the pawl will be urged into the notches on the pull rod as they pass therebeneath. A spring 66 disposed about the pawl 59 acts similarly to urge the pawl 59 downwardly.

The feature of this modification is the location of the slots 57a and 61a which are, of course, in only one wall of the cage and are for the purpose of inserting the pawls in the cage. It will be noted that since these slots are substantially vertical, the pull rod 52 must be withdrawn before the pawls can be positioned in the cage. Conversely, once they are installed, the pawls cannot be withdrawn from the cage unless the pull rod is first withdrawn. The pull rod thus prevents the pawls from dropping into a position in which they could be accidentally, or otherwise, pushed out of the cage.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In combination in a brake lever structure, a tubular guide housing, a pull rod movable in said housing, a pair of parallel wall members extending tangentially upwardly from opposite sides of said tubular housing, brake setting pawls associated with said rod, each pawl having a pair of pivot arms and a pair of idler arms, each of said wall members having a pivot hole and an arcuate slot for receiving the pivot arms of each of said pawls in the pivot holes of said wall members and the idler arms in the arcuate slots, said pawls being spaced longitudinally in said housing in relation to the pitch of the teeth on said rod to provide setting of the brake in increments of the pitch of the teeth.

2. In a brake lever structure, a housing, an elongated ratchet member movable in said housing, the housing comprising a pair of spaced wall members, a brake setting pawl associated with said ratchet member and having a pair of pivot arms and a pair of idler arms, each of said wall members having a pivot hole for receiving a pivot arm of the pawl and an arcuate slot positioned in spaced relation to the adjacent pivot hole for accommodating the idler arm, one of said wall members having a connecting slot extending between the pivot hole and the arcuate slot for assembling the pawl between the wall members.

3. In a brake lever structure, a tubular guide housing, a pull rod having a ratchet associated therewith reciprocable in said housing, a pair of spaced wall members, a pawl pivotally mounted between said wall members and operatively associated in brake setting relation with the ratchet of said pull rod, a first lug struck out from one of said wall members extending between said members, a biasing spring in engagement at one end portion with said pawl and at the other end portion with said first lug, and a second lug struck out from the other of said wall members and extending outwardly and downwardly therefrom providing a conveniently accessible engagement means outside the housing for the end of a replacement spring, the slanted disposition of said second lug preventing displacement of the replacement spring.

4. In a straight pull brake lever structure, an elongated guide housing having tubular guide portions for a pull rod reciprocable in said housing, means at one end of said housing for attaching it to a vehicle fire wall and a cage structure integral with said housing at the other end and including a pair of upwardly extending wall members for supporting means for controlling the brake setting action of the pull rod, said guide housing and cage structure comprising two complementary oppositely disposed stampings secured together along longitudinal marginal portions thereof.

5. In a brake lever structure, a housing, an elongated ratchet member movable in said housing, the housing comprising a pair of spaced wall members, a brake setting pawl associated with said ratchet member and having a pair of pivot arms adjacent one end and a pair of idler arms spaced from the pivot arms and located adjacent the opposite, ratchet-member-engaging end of the pawl, each of said wall members having a pivot hole for receiving a pivot arm of the pawl and an arcuate slot positioned in spaced relation to the adjacent pivot hole for accommodating the corresponding idler arm, one of said wall members having a connecting slot extending between the pivot hole and the arcuate slot for assembling the pawl between the wall members.

6. In combination in a brake lever assembly, a tubular guide housing having a slot therein extending lengthwise of the housing, a pull rod journaled in said guide housing for rotation and reciprocation therein and having a ratchet on a longitudinal portion of its periphery, brake setting pawl means carried by said housing and operatively associated with said ratchet, said pawl means being releasable by rotation of the rod to move the ratchet clear of the pawl means, and a projection narrower than said slot extending radially outwardly from said rod and into said slot, said slot being defined by a side wall engageable by said projection for limiting rotation of said rod into ratcheting position and the slot affording clearance for the projection in rotating the rod into released position from any brake setting condition of the assembly, the opposite ends of the slot having end walls defining limit stops engageable by the projection to limit respectively rearward and forward limits of reciprocal movement of the rod.

7. In combination in a brake lever assembly, a guide housing, a ratcheted pull rod movable in said housing, said housing having a pair of spaced wall members extending upwardly from respective opposite sides thereof, a pawl associated with said rod for setting the brake and having a pair of coaxial oppositely extending pivot arms and an idler arm spaced from the pivot arms and located adjacent the ratchet-engaging end of the pawl, each of said wall members having a pivot hole for receiving a pivot arm of the pawl and one wall having a slot positioned in spaced relation to the adjacent pivot hole for accommodating an arcuate operative movement path for the idler arm, and a biasing spring engaging with said housing and with said idler arm for normally urging the pawl toward the rod.

8. In combination in a brake lever assembly, a guide housing, a pull rod movable in said housing, a pair of spaced wall members extending upwardly from respective opposite sides of said housing having lateral flanges on the upper portion thereof, and a plate secured across said flanges holding the walls in spaced relation and having an escutcheon portion extending over the end of said housing with an aperture therein receiving said pull rod.

9. In a brake lever assembly, a guide housing having a slot therein, a pull rod journalled in said housing along substantially its entire length for rotation and reciprocation therein and having a ratchet on a longitudinal portion of its periphery, brake setting pawl means carried by said housing and associated with said ratchet, said pawl means being releasable by rotation of the rod to move the ratchet clear of the pawl means, and a projection narrower than and extending from said pull rod into said slot, said slot having spaced walls providing clearance for the projection in rotating the rod in a first direction into released position, one of said walls being parallel to the axis of said rod for limiting movement of the projection by rotation of the rod in the other direction to align the ratchet with the pawl means.

10. In combination in a brake actuating assembly of the character described, a rod member having a handle portion at one end and adapted to have connection with a vehicle brake mechanism at the opposite end, a tubular guide substantially encasing the rod member forwardly of the handle and serving to guide the rod for reciprocal and rotary movement, means on said tubular guide adjacent the rear end thereof for attachment to a support, pawl means carried by said tubular guide adjacent to said attachment means and engaging one side of the rod, said side of the rod having ratchet teeth therein engageable by the pawl means for retaining the rod in incremental brake setting position when the rod is pulled rearwardly, a longitudinal slot in said tubular member forwardly from said pawl means, and a lateral projection extending from said rod into said slot, said slot being wider than said projection and permitting a limited range of lateral movement of the projection in response to rotary movement of the rod to an extent in which the rod is in ratcheting position relative to said pawl means when said projection engages one edge of the slot and is in released position relative to the pawl means when the projection is in engagement with the opposite edge of the slot, whereby the slot and projection define rotary limits for the rod and the slot affords longitudinal clearance for the projection for substantial reciprocal brake setting and release movements of the rod.

11. In combination in a brake lever structure, a ratchet member, a guide housing for the ratchet member, said guide housing having spaced pawl-supporting portions, a pawl member disposed between said portions and having oppositely extending pivot arms thereon, said portions having bearings for said pivot arms, an idler arm spaced from said pivot arms and located adjacent to the operative end of the pawl, and a wire biasing spring coiled about the pivot arm nearest said idler arm and engaging with the adjacent housing portion with one end portion of the spring and with said idler arm with the other end portion of the spring for normally biasing the pawl into operative relation with the ratchet member.

12. In combination in a brake lever structure, a ratchet member, a guide housing supporting the ratchet member and having a pair of spaced walls projecting therefrom and defining a pawl space therebetween, said wall members having aligned bearing openings, a pawl having oppositely extending bearing arms disposed in said bearing openings and having an end in engagement with the ratchet member, an idler arm projecting from the pawl member adjacent said end, an opening in the adjacent wall member accommodating said idler arm for arcuate movement as the pawl pivots about the axis of said pivot arms, and a wire biasing spring having a portion coiled about the pivot arm adjacent to the idler arm and with the spring located at the inner side of the adjacent wall member between such wall member and the pawl, the spring having an arm engaging fixedly with said adjacent wall member and another arm engaging in pawl-biasing relation with said idler arm.

13. In combination in a brake lever structure, a ratchet member, a guide housing supporting the ratchet member and having a pair of spaced walls projecting therefrom and defining a pawl space therebetween, said wall members having aligned bearing openings, a pawl having oppositely extending bearing arms disposed in said bearing openings and having an end in engagement with the ratchet member, an idler arm projecting from the pawl member adjacent said end, an opening in the adjacent wall member accommodating said idler arm for arcuate movement as the pawl pivots about the axis of said pivot arms, and a wire biasing spring having a portion coiled about the pivot arm adjacent to the idler arm and with the spring located at the inner side of the adjacent wall member between such wall member and the pawl, the spring having an arm engaging fixedly with said adjacent wall member and another arm engaging in pawl-biasing relation with said idler arm, said adjacent wall member having a lug struck therefrom toward the inside of the pawl space and being engaged by the wall-member-engaging arm of the spring.

RAY A. SANDBERG.

REFERENCES CITED

The following references are of record in the file of this patent:

UNITED STATES PATENTS

| Number | Name | Date |
|---|---|---|
| 511,923 | Barrett | Jan. 2, 1894 |
| 1,034,891 | Disch | Aug. 6, 1912 |
| 1,040,835 | Abrams | Oct. 8, 1912 |
| 1,275,635 | Weaser | Aug. 13, 1918 |
| 2,126,234 | Weber | Aug. 9, 1938 |
| 2,251,893 | Snell | Aug. 5, 1941 |
| 2,256,697 | Weber | Sept. 23, 1941 |
| 2,304,356 | Heller | Dec. 8, 1942 |
| 2,429,224 | Furgueson | Oct. 21, 1947 |